US012675354B2

(12) United States Patent
Markthub et al.

(10) Patent No.: US 12,675,354 B2
(45) Date of Patent: Jul. 7, 2026

(54) LOW LATENCY POST-SEND

(71) Applicant: NVIDIA Corporation, Santa Clara, CA (US)

(72) Inventors: Pak Markthub, Tokyo (JP); Daniel Marcovitch, Yokneam (IL); Akhil Langer, Champaign, IL (US); Yossef Itigin, Hod Hasharon (IL)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/911,690

(22) Filed: Oct. 10, 2024

(65) Prior Publication Data

US 2026/0104954 A1 Apr. 16, 2026

(51) Int. Cl.
*G06F 11/07* (2006.01)

(52) U.S. Cl.
CPC ...... *G06F 11/0745* (2013.01); *G06F 11/0757* (2013.01)

(58) Field of Classification Search
CPC .............. G06F 11/0715; G06F 11/073; G06F 11/0745; G06F 11/0757; G06F 11/0754; G06F 11/076; G06F 11/1402; G06F 11/1405; G06F 9/30087; G06F 9/52; G06F 9/522
See application file for complete search history.

(56) References Cited

U.S. PATENT DOCUMENTS

| | | | | |
|---|---|---|---|---|
| 6,826,619 B1 * | 11/2004 | Khare | ............... | G06F 15/17381 709/224 |
| 2002/0065924 A1 * | 5/2002 | Barrall | .................... | H04L 69/12 709/227 |
| 2003/0091050 A1 * | 5/2003 | Numata | .................. | H04L 47/10 370/392 |
| 2003/0208635 A1 * | 11/2003 | Stevens | .................. | G06F 11/076 719/314 |
| 2006/0164985 A1 * | 7/2006 | Semper | ................. | H04W 28/14 370/328 |
| 2007/0168567 A1 * | 7/2007 | Boyd | ....................... | G06F 9/544 710/5 |
| 2009/0254692 A1 * | 10/2009 | Feehrer | ............... | G06F 11/0757 710/315 |
| 2011/0072174 A1 * | 3/2011 | Choi | ...................... | H04L 1/1835 710/52 |
| 2011/0176557 A1 * | 7/2011 | Bae | ..................... | H04N 21/6437 370/476 |
| 2013/0003751 A1 * | 1/2013 | Huse | ....................... | H04L 47/27 370/412 |
| 2013/0024864 A1 * | 1/2013 | Lakshmi | ................. | G06F 9/524 718/102 |

(Continued)

OTHER PUBLICATIONS

U.S. Appl. No. 18/437,146, filed Feb. 8, 2024, Bhattacharya et al.

*Primary Examiner* — Gabriel Chu
(74) *Attorney, Agent, or Firm* — Sheridan Ross P.C.

(57) ABSTRACT

A system is described having one or more processing devices that prepare a work queue entry (WQE), transmit the WQE or provide a doorbell indication indicating the WQE is available, and, in response to determining an execution failure has occurred, perform at least one additional step to facilitate completion of an operation associated with the WQE.

24 Claims, 4 Drawing Sheets

(56)  References Cited

U.S. PATENT DOCUMENTS

| | | | |
|---|---|---|---|
| 2015/0032752 A1* | 1/2015 | Greifeneder ........... | H04L 41/064 |
| | | | 707/738 |
| 2015/0325108 A1* | 11/2015 | Banerjee ................ | G08B 29/00 |
| | | | 340/506 |
| 2016/0026604 A1* | 1/2016 | Pandit .................... | G06F 15/17 |
| | | | 709/212 |
| 2018/0011763 A1* | 1/2018 | Tanaka ................. | G06F 11/1076 |
| 2018/0089017 A1* | 3/2018 | Cook .................. | G06F 11/0709 |
| 2018/0115795 A1* | 4/2018 | Chinnaiyan .... | H04N 21/234381 |
| 2018/0329743 A1* | 11/2018 | Pope ................... | G06F 11/0793 |
| 2020/0134069 A1* | 4/2020 | Chennen ............ | G06F 11/3055 |
| 2020/0143481 A1* | 5/2020 | Brown .................... | H04W 4/02 |
| 2020/0252264 A1* | 8/2020 | Arora ................. | H04L 43/0817 |
| 2021/0109887 A1* | 4/2021 | Jurski ..................... | G06F 9/542 |
| 2022/0122001 A1* | 4/2022 | Choe ..................... | G06N 20/20 |
| 2022/0368755 A1* | 11/2022 | Rivoalen ................ | H04L 47/30 |
| 2023/0300152 A1* | 9/2023 | Brancato .............. | H04L 41/064 |
| | | | 726/23 |
| 2024/0143434 A1* | 5/2024 | Akavaram .......... | G06F 13/4221 |

* cited by examiner

LOW LATENCY POST-SEND

FIELD OF THE DISCLOSURE

The present disclosure is generally directed to systems, methods, and devices for transmitting data between nodes and, in particular, toward improving kernel-initiated communications.

BACKGROUND

In modern high-performance computing (HPC) systems, communication between computing devices is typically facilitated by a network of interconnected nodes. Each computing device, which may contain a central processing unit (CPU), a graphics processing unit (GPU), and/or other hardware peripheral device, can be considered a node in the network. Data is transmitted between such nodes in a series of discrete operations, with each node serving as a relay point for the data. This structure enables parallel processing and data sharing, significantly improving overall system performance and enabling complex computational tasks. Communication between nodes is governed by various protocols, which can vary depending on the specific requirements of the system and the type of devices involved.

The concept of queue pairs (QPs) supports efficient operation of these inter-network communications. A QP is composed of a work queue including a send queue and a receive queue, acting as endpoints for data transmission between nodes. The send queue holds instructions for outgoing data, while the receive queue accommodates incoming data instructions. QPs also require completion queues which signal the completion of work requests posted to the work queue. The use of QPs enables network technologies such as InfiniBand to provide high-speed, low-latency communication between nodes. The implementation and management of QPs, however, can be complex, necessitating detailed handling of data transmission protocols and error management.

Latency and memory consumption are key factors in the performance and efficiency of these communication networks. Latency refers to the delay experienced during data transmission between nodes, which can impact the overall performance in real-time or high-speed applications. Memory consumption on the other hand relates to the amount of memory resources utilized for data transmission and processing. High memory consumption can lead to inefficiencies, potentially slowing down other processes and limiting the overall system performance. Optimizing both latency and memory consumption is therefore a continuous challenge in the development and operation of high-performance computing systems. Various strategies and technologies are employed to tackle these issues, aiming to deliver fast, efficient, and reliable communication between devices.

Technical shortcomings of conventional computing system networks relating to memory consumption and latency negatively affect real-world applications involving, for example, artificial intelligence models, mathematical calculations, and other computationally complex applications.

SUMMARY

In some communication protocols, such as an MLX5 post-send protocol, work queue entry (WQE) submission involves enqueueing a WQE into a ring buffer and updating the head pointer to submit work to a peripheral device, such as a network interface card (NIC) or similar type of Input/

Output (IO) device. In particular, a post-send protocol may include: (1) writing the WQE (or WQEs) in a work queue (WQ) buffer; (2) updating the doorbell record (DBR); and ringing the doorbell (DB).

In the GPUDirect Async—Kernel Initiated networking protocol (GDA-KI), WQ and DBR are in GPU memory. The DB is usually provided on the NIC. In CPU-centric libraries such as libibverbs, WQ and DBR are in host memory and the DB is on the NIC.

Conventional post-send algorithms are inherently sequential processes due to being designed for use by CPUs. Communication protocols such as GDA-KI, which utilize GPUs instead of CPUs, leverage a GPU streaming multi-processor (SM) to submit WQEs to the NIC. If traditional WQE submission algorithms are strictly followed, the GPU will need to (1) lock the network QP, which limits the concurrency, or (2) create one QP per thread, which may consume hundreds GB of GPU memory in real applications. In addition, each WQE submission will require issuing a memory barrier, which incurs significant latency for the GPU SMs.

Implementations of the present disclosure may operate in an architecture having a scalable array of multithreaded SMs. Each SM may include a set of execution units, a set of registers, and a chunk of shared memory. The basic unit of execution for a processing unit (e.g., a CPU or GPU) may be referred to as a warp. A warp may correspond to a collection of threads (e.g., 32 threads may belong to a warp) that are executed simultaneously by an SM. Multiple warps can be executed on an SM at once.

A compute thread array (CTA), which may be referred to as a thread block, may correspond to a group of threads that can cooperate by sharing data through shared memory and synchronizing their execution. A CTA may be executed by one or more SMs, and multiple CTAs may run in parallel across different SMs. Each CTA may have access to a shared memory space that is visible to all threads within the CTA, allowing for efficient communication and data sharing between the threads of the CTA.

A kernel grid as referred to herein may be a set of threads which are launched by a single kernel. The threads of a kernel grid may be grouped into CTAs, allowing the threads to share resources and synchronize execution. When a program on a host CPU invokes a kernel grid, CTAs of the grid may be enumerated and distributed to SMs with available execution capacity. The threads of a CTA may execute concurrently on one SM, and multiple CTAs can execute concurrently on one SM. As CTAs terminate, new CTAs may be launched on the vacated SMs.

A CTA may include one or more warps of threads. As an example, a CTA may include 128 threads, and the threads may be divided into four warps of 32 threads per warp. Each warp may be scheduled and executed independently, whether in parallel or in sequence.

Implementations of the present disclosure improve communication efficiencies by providing a post-send algorithm with a lower latency as compared to conventional post-send algorithms. Implementations of the present disclosure enable the reduction of latency in a number of computing environments, including, for example, using a processing device (such as a CPU or GPU) to communicate with another processing device (such as another CPU or GPU) or a peripheral device (such as a NIC or a solid state drive (SSD)).

While embodiments of the present disclosure will be described in connection with an architecture having a GPU communicate with a NIC, it should be appreciated that features depicted and described herein can be utilized in other architectures. Specifically, but without limitation, embodiments of the present disclosure can be deployed in any computing architecture in which threads issue WQE slot reservation and/or WQE creation instructions/requests.

One aspect of the present disclosure is to reduce the amount of time required to ring the DB following data being written by an application. This approach involves ringing the DB without first updating a DBR buffer. A completion indication, such as a completion queue (CQ) or a completion counter may be utilized. In some embodiments, a CQ may be periodically polled to determine whether an execution failure has occurred. An execution failure as described herein may occur as a result of a WQE either not being received by a destination device, or a WQE being received but not resulting in completion of an operation associated with the WQE as expected. An execution failure may occur when a timeout occurs. A timeout, as described herein, may be represented as a timeout status or a timeout indication. While certain implementations described herein may be described in terms of determining a timeout has occurred or a timeout status exists, it should be appreciated that the same or similar implementations may involve determining any type of execution failure has occurred. That is, the systems and methods described herein should not be considered as being limited to determining a timeout has occurred as opposed to any other type of execution failure.

A QP may be connected to a completion counter instead of a queue, or a WQE may indicate a completion queue or counter. Any of these mechanisms can be used to indicate that work has been successfully completed. While lack of completion may indicate that work is still pending, the lack of completion may also indicate that the partial work submission was not successful and a full work submission is required. If an execution failure occurs, the DBR buffer may be updated, and the DB may be re-rung to resolve the timeout status.

While implementing a full work submission protocol is desired to guarantee work execution, some partial work submission protocols exist, which typically cause work execution. A work completion indication, or lack thereof, can be utilized to identify the cases in which work execution did not start—at which time—the submission protocol may be finalized. The implementation of a WQE, then barrier, then DBR, then barrier, and then DB is one example of a full submission protocol. The implementation of a WQE, then barrier, and then DB is one example of a partial submission protocol.

Execution of a WQE may be used in connection with a register, such as a BlueFlame (BF) register. The description of BF may relate to a low-latency mechanism that can be used to post latency-critical Send WQEs to a device. When BF is used, WQEs can be written directly to a PCIe BAR of the device so that the device may handle them directly, thus shortening the execution latency. It may be desirable to use BF when a device is lightly loaded. For high-bandwidth scenarios, it may be desirable to use regular posting (e.g., without BF). A "full" protocol for the use of BF may include the following: WQE, then barrier, then DBR, then barrier, then BF.

An advantage of the systems and methods described herein is reducing the amount of time and computing required to perform a post-send. While contemporary methods of ringing the DB require updating a DBR prior to ringing the DB, the methods described herein may be implemented by ringing the DB without updating the DBR. A benefit of not updating the DBR is the avoidance of a memory barrier. By not updating the DBR, the post-send algorithm may be completed using fewer memory barriers as compared to conventional post-send algorithms, thereby cutting the required amount of time consumed by performing the post-send algorithms.

According to at least some embodiments, the solutions described herein can be deployed in a situation where two methods of work submission are possible: (1) a full implementation and/or (2) a partial implementation. In a full implementation, work execution may be guaranteed. In a partial implementation, work execution may not be guaranteed, but the execution may be non-destructive. In partial implementation, either work will be executed correctly, will not be executed at all, or will not be executed incorrectly. Non-execution may be detected (e.g., via a completion indication, a lack of completion indication, or some other mechanism). The non-execution may be fixable by supplementing the initial partial implementation with an additional work execution so that the operation is completed. The DB and BF examples described herein may include both full and/or partial implementations. Other full or partial implementations may be utilized as well. For instance, a partial flow may be supported for a WQE buffer whereby all locations which do not have valid WQEs are stamped with a predetermined code (e.g., a valid/legal opcode, an illegal opcode, or a non-destructive (e.g., NOP) opcode) and/or the BF may be written without writing the WQE at all. If completion with error is received due to a bad or non-destructive opcode: the system may be configured to re-write the WQEs starting from the error CQE, write DBR, and then DB. It should also be appreciated that for some devices, a DBR may not be required. With respect to such devices, the BF full/partial flows may still be relevant and utilized. In some embodiments, all WQEs may be pre-stamped with a NOP opcode. This opcode is considered valid and legal. It may instruct the recipient thereof (e.g., the NIC) to do nothing and just simply generates the CQE. This particular opcode may not be needed in other flows. For instance, after ringing BF, it may be desirable to wait for the corresponding CQE. This CQE provides the opcode that has been executed. If it is NOP, it can be inferred that BF has been downgraded to DB, and the posting may require re-execution.

In view of the above, one or more of the following are contemplated:

One aspect of the present disclosure is to provide system comprising one or more circuits to: prepare a work queue entry (WQE); transmit the WQE to a destination device or provide a doorbell indication to the destination device indicating that the WQE is available; and in response to determining an execution failure has occurred, perform at least one step to facilitate completion of an operation associated with the WQE.

In some embodiments, the WQE is written to memory prior to transmitting the WQE or providing the doorbell indication.

In some embodiments, the execution failure comprises failing to receive a completion indication within a predetermined amount of time.

In some embodiments, the execution failure comprises receiving a status indicating failure.

In some embodiments, the one or more circuits are further to repeat transmitting the WQE to the destination device or providing the doorbell indication to the destination device after determining the execution failure has occurred.

In some embodiments, the at least one step to facilitate completion of the operation associated with the WQE comprises writing a doorbell record to memory and repeating the transmitting of the WQE to the destination device or providing the doorbell indication to the destination device.

In some embodiments, the one or more circuits are further to write the WQE to memory.

In some embodiments, providing the doorbell indication to the destination device comprises writing a doorbell (DB) to memory of the destination device, wherein the DB enables the destination device to read the WQE.

In some embodiments, the at least one step to facilitate completion of the operation associated with the WQE comprises updating a doorbell record (DBR) and performing a memory barrier.

In some embodiments, the at least one step to facilitate completion of the operation associated with the WQE further comprises retransmitting the WQE to the destination device or providing a second doorbell indication to the destination device indicating that the WQE is available.

In some embodiments, transmitting the WQE to the destination device comprises writing the WQE to memory of the destination device.

In some embodiments, the one or more circuits are further to stamp a WQE buffer.

In some embodiments, the WQE is transmitted to the destination device in an absence of writing the WQE to memory.

In some embodiments, the WQE is transmitted to the destination device after writing the WQE to memory, wherein no memory barrier was performed prior to transmitting the WQE to the destination device.

In some embodiments, the at least one step to facilitate completion of the operation associated with the WQE comprises: writing the WQE to memory; performing a memory barrier; and ringing a doorbell (DB).

In some embodiments, the at least one step further comprises updating a doorbell record (DBR) and performing a second memory barrier.

In some embodiments, updating the DBR comprises updating the DBR with a producer index.

In some embodiments, the one or more circuits are to repeat at least one of preparing the WQE and transmitting the WQE to the destination device or providing the doorbell indication multiple times before performing the at least one step to facilitate completion of the operation associated with the WQE.

In some embodiments, the execution failure comprises receiving one or more of a completion indication comprising an entry in a completion queue (CQ), an asynchronous event, a status in a memory location, and an interrupt.

In some embodiments, receiving the completion indication comprises polling the CQ.

In some embodiments, the one or more circuits perform fewer than two memory barriers prior to polling the CQ.

In some embodiments, transmitting the WQE to the destination device comprises using a plurality of threads to write the WQE to memory of the destination device.

In some embodiments, sequential WQEs are written to a single address of the memory of the destination device.

In some embodiments, sequential WQEs are written to different addresses of the memory of the destination device.

In some embodiments, the one or more circuits are further to synchronize the plurality of threads after preparing the WQE and before transmitting the WQE.

In some embodiments, prior to preparing the WQE, the one or more circuits determine a number of in-flight WQEs is less than a threshold.

Another aspect of the present disclosure is to provide a communication apparatus comprising one or more circuits to: prepare a work queue entry (WQE); transmit the WQE to a destination device or provide a doorbell indication to the destination device indicating that the WQE is available; and in response to determining an execution failure has occurred, perform at least one step to facilitate completion of an operation associated with the WQE.

Additional features and advantages are described herein and will be apparent from the following Description and the figures.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
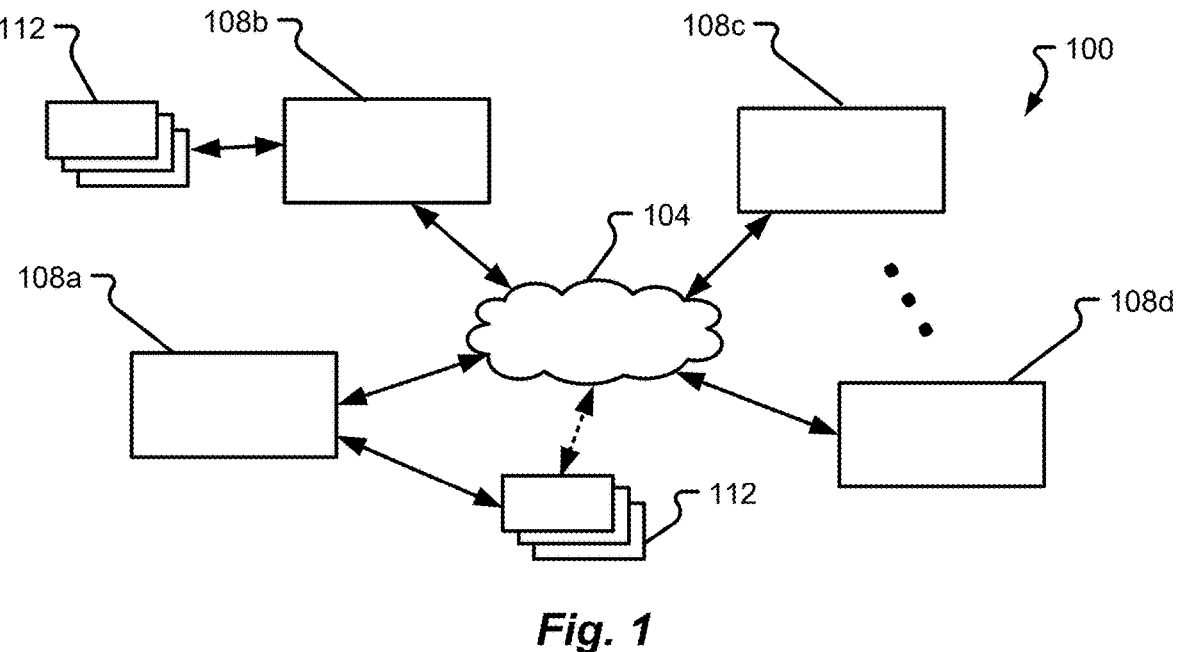
FIG. 1 is a block diagram of a computing architecture used in accordance with one or more of the embodiments described herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Any of the steps, functions, and operations discussed herein can be performed continuously and automatically.

Systems and methods of this disclosure may be described in relation to a processing device communicating with a peripheral device and/or another processing device. However, to avoid unnecessarily obscuring the present disclosure, the description may omit a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Additionally, it should be appreciated that any number of variations and modifications of the disclosure can be used. It would, for example, be possible to provide a system or method utilizing some features of the disclosure without other features.

Conventional computer systems employing one or more CPUs and one or more GPUs typically utilize a star topology, positioning the CPU(s) at the center of the communication between components of the computer system. Such components including, for example, the GPU(s), other CPU(s), as well as one or more peripheral devices such as network devices, additional GPUs, NVMe SSDs. In such a system, the CPU(s) act as a central hub through which data flows, including communications between the GPU and various peripheral devices and other components. This means that for a GPU to access data from, or send data to, peripheral devices and/or processing devices, the GPU must do so via a CPU, relying on the CPU to manage and facilitate data transfers. Such an architecture can introduce bottlenecks, as communications are funneled through the CPU. Consequently, the efficiency of data transfer and overall system performance can be contingent on the CPU's capacity to handle the data streams, and a GPUs ability to communicate with peripheral devices is limited by the performance of the CPU.

Direct communication between a GPU and other devices (such as peripheral and/or processing devices), without involving a CPU as the middleman, can significantly enhance system performance and efficiency in various computing environments. This approach offers several benefits, particularly in HPC, data centers, and AI or machine learning applications, where speed and efficient data handling are critical.

Bypassing the CPU for communication between GPUs and other devices can drastically reduce latency. While conventional systems, as described above, rely on a CPU acting as a mediator, direct GPU-to-peripheral (or -processing) device communication eliminates the involvement of the CPU, allowing for quicker data exchanges.

Direct paths between GPUs and peripheral devices can utilize the full bandwidth of the interconnect technology (such as PCIe), without sharing or competing for bandwidth with the CPU or other devices on an interconnect bus of the CPU. Moreover, applications such as artificial intelligence (AI) and machine learning (ML) can be improved by quickly offloading data processed by the GPU to storage devices (such as NVMe SSDs) or sent over a network to other nodes for further processing. Direct GPU-to-peripheral device communication streamlines such workflows, enabling more efficient data processing pipelines without the CPU becoming a bottleneck.

Offloading communication tasks from the CPU further frees up resources of the CPU for other critical tasks. This may be particularly beneficial in systems where the CPU manages multiple tasks simultaneously. Reducing the communication overhead of the CPU can lead to overall improvements in system performance and responsiveness.

Direct communication by GPUs also supports better parallelism in system architectures. GPUs designed for parallel processing can simultaneously interact with multiple peripheral devices, enhancing the system's ability to handle concurrent data streams and parallel processing tasks.

Direct GPU-to-peripheral device communication may be enabled through technologies such as GPUDirect Async-Kernel-Initiated (GDA-KI) network communications which allows GPUs to directly access data from memory devices (e.g., an NVMe SSD), NICs, and other peripheral devices. While certain implementations described herein are described specifically relating to GDA-KI and communications between a GPU and a NIC, it should be appreciated that the systems and methods described herein may be used to enable communication between any processing device (e.g., a CPU, GPU, data-path accelerator (DPA), etc.) and any peripheral device (e.g., a NIC, a memory device such as an NVMe SSD, etc.) or any processing device (e.g., a CPU, GPU, DPA, etc.).

The use of GPUs as a means to offload computationally intensive tasks from CPUs and the use of networks of computing nodes to implement computationally intensive tasks, whether executed by CPUs or GPUs, is increasingly important to users such as scientific researchers seeking to execute AI models and other computationally intensive processes. The growing demand for high-performance computing in various domains, including scientific simulations, machine learning, and image processing, has driven the need for efficient and cost-effective computational resources. The limitations of network communication performance and the increasing importance of parallelism have prompted researchers and other users to explore alternatives to the use of single computing devices for performing data processing. As a result, GPUs have emerged as an approach to offload computationally intensive tasks from CPUs and networks of computing systems have become useful for executing complex processing applications.

In conventional systems, whenever a GPU needs to send data to a node, such as via a peripheral device or directly to a processing device, a CPU is first notified. The CPU prepares a WQE, updates a DBR on a NIC, and rings a DB. This process may be referred to as a post-send algorithm. Next, the NIC may access the data from memory of the GPU to send to the node. For example, while in some implementations GPUDirect RDMA may be used so that the NIC and the GPU can communicate directly, the control path still flows through the CPU. While the systems and methods described herein are generally described in relation to GPU-Direct, it should be appreciated that in some implementations other technologies enabling a NIC to access data from GPU memory may be utilized.

GDA-KI, as referenced above, is a network software technology which moves the control path onto the GPU, using SMs of the GPU to prepare WQEs, write to the DBR, and ring the DB. As a result, the message rate that can be achieved by a GPU increases by several folds (e.g., up to 36 times as fast as conventional systems). Implementations of the present disclosure may be useful when a GPU is interacting with any I/O device that employs a similar command submission mechanism like the NIC mechanism(s) described herein, or when a GPU is directly communicating with another GPU or other type of processing device.

While GDA-KI presents a number of benefits by enabling a GPU to communicate with a NIC, such benefits may be enhanced by reducing the amount of time required for such communication to occur. A major factor which affects latency is the requirement of multiple memory barriers to be performed when executing a post-send algorithm. The systems and methods described herein enable a reduction in the number of memory barriers to be performed when executing a post-send algorithm.

A memory barrier as described herein may be a function which ensures proper ordering and visibility of memory operations across different parts of a system. A memory barrier may be referred to as one or more of a membar, threadfence, threadfence block, or another term. A memory barrier may be used to ensure memory operations (including reads and writes) occur in the desired order. When multiple threads or processes execute concurrently, memory operations can appear out of order. This can lead to data inconsistencies, where the outcome of a program incorrectly depends on the timing of threads.

A memory barrier may ensure that all global and shared memory writes made by the current thread are visible to all threads in the grid. A memory barrier may also ensure that all memory operations issued before the memory barrier are completed before any subsequent memory operations begin. Such a memory barrier may be used to guarantee correct data handling when performing parallel computations or when resources are shared across different parts of a pipeline.

Examples of a memory barrier as described herein include "Membar.gl" and "Membar.sys." Membar.gl is a global memory barrier which ensures completion and/or visibility of memory operations within a global memory space. When Membar.gl is performed by a GPU, the memory barrier ensures ordering and visibility of writes across multiple threads within the GPU. Membar.sys is a system-wide memory barrier which ensures completion and visibility of memory operations across an entire system, including global memory, shared memory, as well as memory operations which may be observed by other processing and/or peripheral devices. When Member.sys is performed by a GPU, the memory barrier ensures ordering and visibility of writes across multiple threads within the GPU as well as within other processing and/or peripheral devices.

Both Membar.gl and Membar.sys are time-consuming relative to other functions involved in a post-send algorithm. However, Membar.sys is even more time-consuming than Membar.gl (e.g., Membar.sys may consume four or more times the amount of time required to perform Membar.gl). As a result, a post-send algorithm-which avoids the necessity of one or more Membar.sys functions and/or one or more Membar.gl functions-enables a DB to be rung in a reduced amount of time as compared to conventional methods.

By reducing the number of memory barriers to be performed when executing a post-send algorithm, the systems and methods described herein provide a low latency mechanism for communication between a processing device (such as a GPU, CPU, or other device) and a peripheral device (such as a NIC, SSD, or other device) and/or another processing device (such as a GPU or other device).

Figure 2:
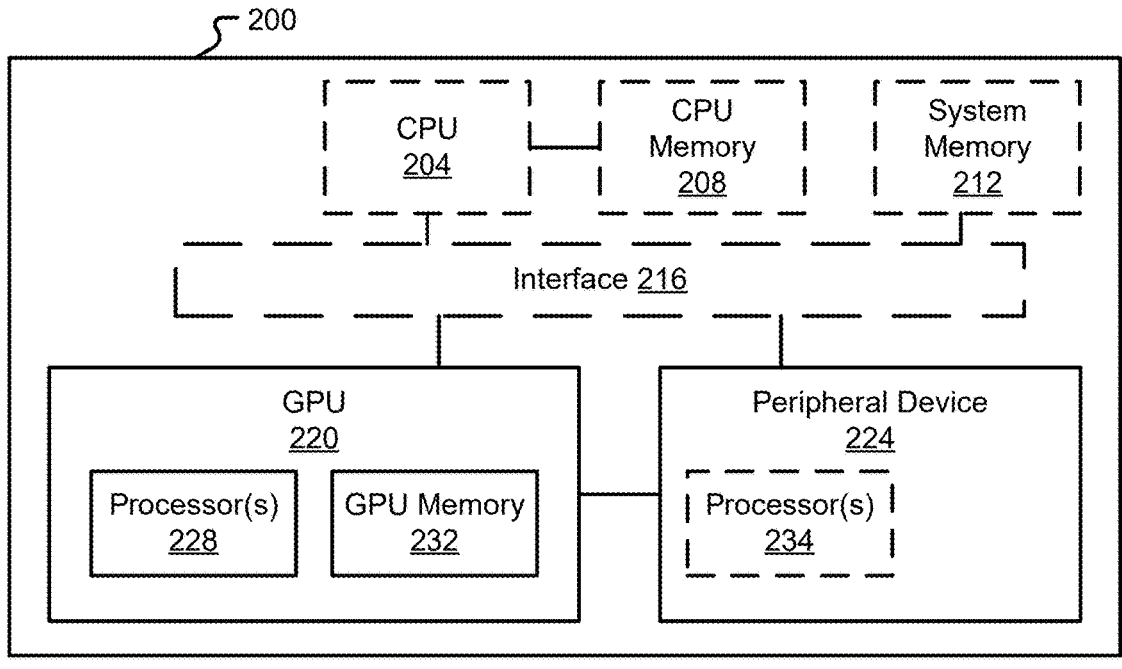
FIG. 2 is a block diagram of a system in accordance with one or more of the embodiments described herein.

Reference is now made to FIG. 1 and FIG. 2, in which a computing architecture 100 and system 200 are respectively illustrated in accordance with one or more of the implementations described herein. While FIGS. 1 and 2 illustrate the computing architecture 100 and the system 200 as including specific components and/or specific numbers of components, it should be appreciated that the systems and methods described herein may be implemented with a greater or lesser number of components and/or components not illustrated. As an example, FIG. 2 illustrates a system 200 which includes a GPU 220 and GPU memory 232. It should be appreciated that a GPU may not be required to implement the systems and methods described herein. Instead, the role of the GPU 220 and GPU memory 232 may be performed by a CPU, a DPA, or another processing device. Additionally, the system 200 illustrates a peripheral device 224 within the system 200. The systems and methods described herein may be performed without requiring a peripheral device, such as in the scenario of a first processing device utilizing the systems and methods described herein to communicate with a second processing device without the involvement of a peripheral device.

As illustrated in FIG. 1, computing architecture 100 may include one or more peer computing systems 108a-d communicating with each other via a network 104. Each of the one or more peer computing systems 108a-d may connect to each other as well as to other peer devices 112 to access shared resources, services, and data, via the network 104. The peer computing systems 108*a-d* may be, for example, client devices such as personal computers, laptops, smartphones, IoT devices, as well as switches or servers, or any type of computing system capable of sending data to and receiving data over a network 104.

Each of the peer devices 112 may comprise network interfaces including, for example, a transceiver. Some or all of the peer devices 112 may be capable of receiving and transmitting packets in conformance with applicable protocols such as TCP, although other protocols may be used. In some embodiments, peer devices 112 may be configured to communicate with peer computing systems 108*a* using memory transactions and a local system bus, such as PCIe, CXL, Nvlink, Nvlink-C2C, etc. While peer devices 112 are shown as being connected to peer computing systems 108*a-d*, it should be appreciated that peer devices 112 may also be configured to receive and transmit packets directly to and/or directly from network 104.

In some implementations, one or more peer computing systems 108*a-d* and devices 112 may be switches, proxies, gateways, load balancers, etc. Such systems 108*a-d* and devices 112 may serve as intermediaries between clients and/or servers, relaying or modifying the communication between the clients and/or servers. In some implementations, one or more of the peer computing systems 108*a-d* and devices 112 may be IoT devices, such as sensors, actuators, and/or embedded systems, connected to the networks 104. Such IoT devices may act as clients, servers, or both, depending on implementations and the specific IoT applications. For example, a first peer computing system or device may be a smart thermostat acting as a client, while a second peer computing system or device may be a central server for analysis or a smartphone executing an app.

As should be appreciated, in the realm of high-performance computing, a myriad of peer computing systems 108*a-d* can utilize QPs and WQ buffers for network communication. For example, in server farms, data centers, or clusters used for big data analytics and scientific computing, CPUs and/or GPUs of a peer computing system 108*a-d* may use QPs and WQ buffers to send and receive data between each other, such as via protocols including InfiniBand or Ethernet.

A system 200 as illustrated in FIG. 2 having one or more processing devices (such as GPUs 220) may correspond to an example of a peer computing system 108*a-d* and/or a peer device 112. The advent of general-purpose computing on GPU has led to widespread use of GPUs 220 for tasks beyond just rendering graphics, especially in fields like machine learning, deep learning, and data mining. GPUs 220 may be capable of handling thousands of threads simultaneously, making them well-suited for massively parallel tasks.

While the system 200 may be configured to communicate with other systems 200 over the network 104 as described herein, it should be appreciated that the systems 200 may also communicate with other peer computing systems 108*a-d* and/or peer devices 112, which may or may not utilize the network 104.

The network 104 illustrated in FIG. 1 may rely on various networking hardware and protocols to establish communication between a peer computing system 108*a-d* and other peer computing systems 108*a-d* and/or peer devices 112. Such infrastructure may include one or more routers, switches, and/or access points, as well as wired and/or wireless connections. The network 104 may be, for example, a local area network (LAN) interconnecting peer computing systems 108*a-d* and peer devices 112. A LAN may use Ethernet or Wi-Fi technologies to provide communication between the peer computing systems.

In some implementations, the network 104 may be, for example, a wide area network (WAN) and may be used to connect peer devices 112 with one or more peer computing systems 108*a-d*. A WAN may comprise, for example, one or more of lines, satellite links, cellular networks. WANs may use various transmission technologies, such as leased lines, satellite links, or cellular networks, to provide long-distance communication. Transmission control protocol (TCP) communication over a WAN may be used, for example, to enable peer computing systems 108*a-d* to communicate reliably across vast distances. In some implementations, network 104 may comprise the Internet, one or more mobile networks, such as 4G, 5G, LTE, virtual networks, such as a VPN, or some combination thereof.

System 200, like the peer computing systems 108*a-d*, may be or may include client devices and may encompass a wide range of devices, including desktop computers, laptops, smartphones, IoT devices, etc. Such systems 200 may execute one or more applications which communicate with other systems 200 to access resources or services. For example, a first system 200 may execute a web browser and a second system 200 may act as a web server. The first system 200 may communicate with the second system 200 to request and display web content. As another example, a first system 200 may execute a file-sharing application and a second system 200 may act as a file server. The first system 200 may communicate with the second system 200 to upload or download files. As another example, a first system 200 may act as an AI server capable of being used by a second system 200 to offload computationally intensive processes for execution in parallel by one or more GPUs 220 of the first system 200. Applications running on the systems 200 may be responsible for initiating communication with other systems 200 making requests for resources or services, and processing data. The network 104 may enable the systems 200 to communicate any number of concurrent communications with any number of peer computing systems 108*a-d* and/or peer devices 112 simultaneously.

It should also be appreciated that in some embodiments, the systems and methods described herein may be executed without a network 104 connection. For example, one or more peer computing systems 108*a-d* (or systems 200) may be capable of communicating directly with other peer computing systems 108*a-d* (or systems 200) without relying on any particular network 104.

As illustrated in FIG. 2, each a system 200 may include one or more one or more GPUs 220 and one or more peripheral devices 224. In some implementations, each system 200 may also include one or more CPUs 204. Each of the CPUs 204, GPUs 220, and peripheral devices 224 may communicate via an interface 216.

A peripheral device 224 as described herein may comprise one or more circuits capable of acting as an interface between components of the system 200, such as the CPU 204 and the GPU 220. The peripheral device 224 may also act as an interface between components of the system 200 and the network 104. A peripheral device 224 may, for example, comprise a NIC; however, the systems and methods described herein may be applied to any type of peripheral device, such as a GPU, a CPU, a memory device such as an NVMe SSD, or another component. In the case of a NIC, the peripheral device 224 may enable data transmission and reception such that peer computing systems 108*a-d* may communicate with the system 200. In other implementations, a peripheral device 224 may perform other functions. A peripheral device 224 may in some implementations comprise one or more of a peripheral component interconnect express (PCIe) card, a network adapter, a USB adapter, and/or may be integrated into a PCB such as a motherboard. The peripheral device 224 may also include one or more processors 234. A processor 234 of a peripheral device 224 may be, for example, a streaming multiprocessor (SM), a RISC processor, a CISC processor, a DSP, a baseband processor, an ASIC, an FPGA, an RFIC, another processor (including those discussed herein), or any suitable combination thereof. The peripheral device 224 may be capable of supporting any number of network protocols such as Ethernet, Wi-Fi, fiber channel, etc.

One or more CPUs 204 of the system 200 may each comprise one or more circuits capable of executing instructions and performing calculations. The CPUs 204 may be capable of interpreting and processing data received by the system 200 via the peripheral device 224. CPUs 204 of a system 200 may each comprise one or more arithmetic logic units (ALUs) capable of performing arithmetic and/or logical operations, such as addition, subtraction, and bitwise operations. The CPUs 204 may also or alternatively comprise one or more control unit (CUs) which may be capable of managing the flow of instructions and data within the CPU 204. CUs of the CPU 204 may be configured to fetch instructions from CPU memory 208 or system memory 212, decode the instructions, and direct appropriate components to execute operations based on the instructions.

A CPU 204 of the system 200 may include, for example, a reduced instruction set computing (RISC) processor, a complex instruction set computing (CISC) processor, a digital signal processor (DSP) such as a baseband processor, an application-specific integrated circuit (ASIC), a field-programmable gate array (FPGA), a radio-frequency integrated circuit (RFIC), another processor (including those discussed herein), or any suitable combination thereof. Similarly, a GPU 220 as described herein may include a processor 228 such as an SM, a RISC processor, a CISC processor, a DSP, a baseband processor, an ASIC, an FPGA, an RFIC, another processor (including those discussed herein), or any suitable combination thereof.

A CPU 204 and/or a processor 228 of a GPU 220 as described herein may incorporate multiple processing cores, allowing the CPU 204 (and/or the GPU 220) to execute multiple instructions simultaneously, and/or may be capable of performing hyperthreading to execute multiple threads concurrently.

One or more GPUs 220 of the system 200 may each comprise one or more circuits capable of acting as specialized processing components to handle computationally intensive tasks, such as rendering graphics and performing complex mathematical calculations. GPUs 220 may be capable of parallel execution of general-purpose tasks alongside the CPUs 204.

As noted above, a GPU 220 may comprise one or more SMs, CUs, or processors 228, which may be responsible for executing instructions in parallel. Each SM, CU, or processor 228 of a GPU 220 may contain one or more processing cores or ALUs which may be capable of performing arithmetic and/or logical operations concurrently.

One, some, or all GPUs 220 of the system 200 may be capable of executing tasks such as scientific simulations, machine learning, and data analysis. For example, a GPU 220 of the system 200 may be designed for operation in workstation environments, such as for performing scientific simulations, executing and/or training machine learning models, performing data analysis, etc.

The GPU 220 may execute one or more kernels. Kernels executed by the GPU 220 may perform specific, parallelizable tasks on the GPU 220. Such kernels may be written using GPU programming languages or frameworks, such as CUDA.

An interface 216 of the system 200 may comprise one or more circuits capable of connecting peripheral devices such as the peripheral device 224, one or more GPUs 220, and one or more CPUs 204 to a motherboard of the system 200, as well as one or more devices used for system memory 212. The interface 216 may comprise one or more high-speed lanes. Each lane may be, for example, a serial lane, and may consist of a pair of signaling wires for transmitting and/or receiving data. The interface 216 may be, for example, a PCIe bus.

The device(s) used for system memory 212 may include solid-state drives (SSDs), such as NVMe SSDs. The system memory 212 may be capable of providing fast and efficient data access and storage. Each of the CPU 204, GPU 220, and peripheral device 224 may be capable of sending data to and reading data from the system memory 212 via the interface 216. Each of the CPU 204, GPU 220, and peripheral device 224. Illustratively, but without limitation, the CPU 204 may have access to dedicated CPU memory 208 and the GPU 220 may have one or more devices dedicated to GPU memory 232.

The disclosed systems and methods may be adaptable and usable for both systems with and without GPUs 220. Implementations of the present disclosure may include a GPU 220 performing data packet preparation, scheduling, sending, and/or transmission. In some embodiments, the CPU 204 may instruct the GPU 220 (or multiple GPUs 220) to perform various tasks. Such platforms may employ GPU accelerated signal processing, such as by using GDA-KI to enable the GPU 220 to prepare network work descriptors or WQEs and submit such descriptors to the peripheral device 224.

Because the CPU 204 and GPU 220 may have different memory spaces, data to be processed by the GPU 220 may be moved from the CPU 204 to the GPU 220 before the computation starts, and the results of the computation may be moved back to the CPU 204 once computation has completed. System memory 212 may refer to system-wide memory accessible to all threads of a processing device such as the GPU 220 as well as a host such as the CPU 204. In some implementations, global memory may be allocated and deallocated by the host and may be used to initialize the data that the GPU 220 will process.

Figure 3:
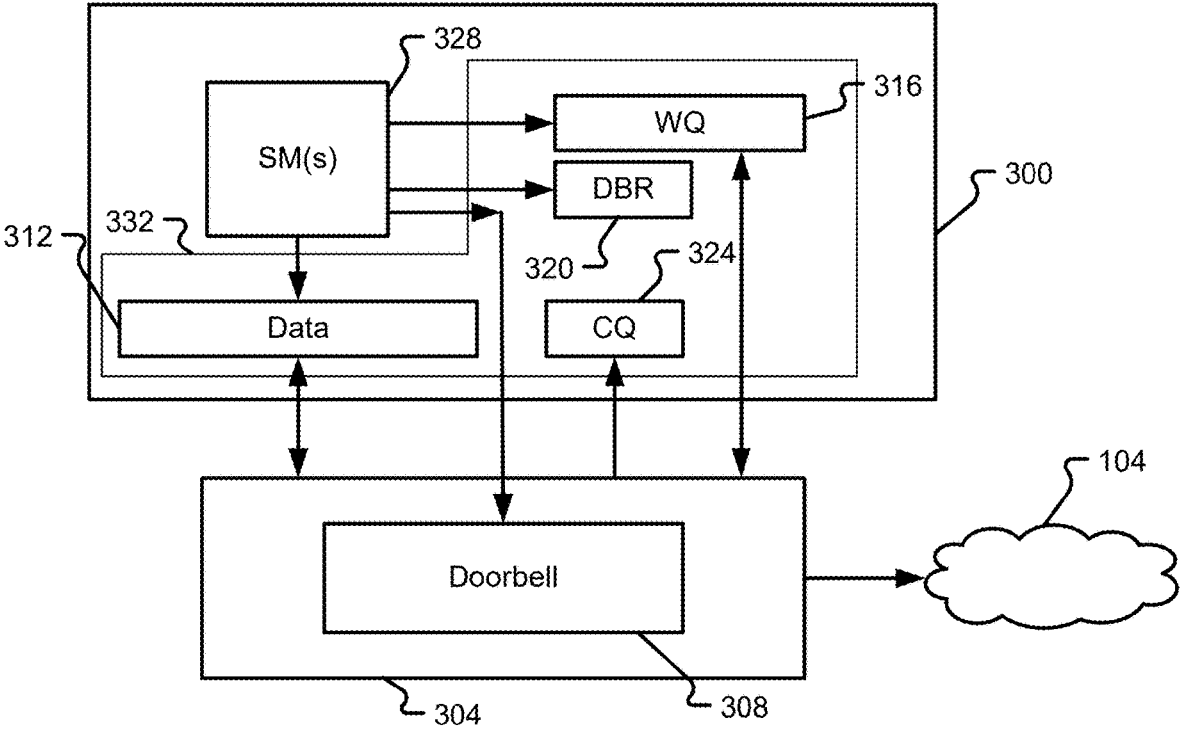
FIG. 3 is a block diagram of system components and interactions therebetween in accordance with one or more of the embodiments described herein.

Referring now to FIG. 3, additional details of a processing unit 300 interacting with a device 304 will be described in accordance with at least some embodiments of the present disclosure. A CPU 204 and/or GPU 220 may correspond to examples of a processing unit 300. Other examples of a processing unit 300 include, without limitation, a DPA, a DPU, a microprocessor, a collection of CPUs 204, a collection of GPUs 220, a collection of DPUs, a collection of microprocessors, and the like.

A peripheral device 224 may correspond to an example of a device 304. It should be appreciated that embodiments of the present disclosure may apply to other queue-based producer-consumer models, such as the NVMe submission queue. In this context, a device 304 may correspond to a different type of device, such as a memory device. In some implementations, a CPU 204 and/or GPU 220 may correspond to examples of a processing unit 300. Other examples of a processing unit 300 include, without limitation, a DPA, a DPU, a microprocessor, a collection of CPUs 204, a collection of GPUs 220, a collection of DPUs, a collection of microprocessors, and the like.

The processing unit 300 is illustrated to include one or more SMs 328. Within the context of the processing unit 300, the basic unit of execution may be referred to as a warp. A warp, as described above, is a collection of threads that are executed simultaneously by an SM 328. Multiple warps can be executed by one SM 328 at a single time.

When a program on the processing unit 300 invokes a kernel grid, CTAs of the kernel grid may be enumerated and distributed to one or more SMs 328 with available execution capacity. The threads of a CTA execute concurrently on one SM 328, and multiple CTAs can execute concurrently on one SM 328. As CTAs terminate, new CTAs may be launched on the vacated SMs 328.

Applications executed by an SM 328 of the processing unit 300 may write data 312 to memory 332. When data 312 needs to be transmitted to a destination, the processing unit 300 may transfer the data 312 to the device 304 and/or receive data 312 from the device 304 using a WQ 316, a DBR 320, and a CQ 324. Each of the WQ 316, DBR 320, and CQ 324 may comprise one or more buffers or logical storage units within the memory 332. The WQ 316, DBR 320, and CQ 324 may enable the SMs 328 of the processing unit 300 to interact directly with the device 304. The device 304 may store a DB register 308. The processing unit 300 may be capable of ringing the DB by writing to the DB register 308. Using this mechanism, the device 304 may be notified that one or more WQEs are available for processing. In some implementations, the processing unit 300 may ring the DB by writing a producer index or a sequence number associated with the one or more WQEs to the DB register 308 which may be used by the device 304 to fetch the WQE(s) using a read operation.

Each WQ 316 may store one or more WQEs, which may represent operations to be performed. A WQ 316 may operate as a repository for WQEs. Each WQE in a WQ 316 may contain information about an operation such as the type of operation, the location of the data, and other control information. Thus, each WQ 316 consumes memory for every WQE it holds, impacting the overall memory consumption of a QP.

The information contained within a WQE may include a control segment (referred to herein as a ctrl segment) as well as other information, such as a data segment. A ctrl segment of a WQE may include, for example, an operation code modifier (referred to herein as OPC_MOD), a WQE index (referred to herein as wqe_index or producer index), an operation code (referred to herein as OPCODE), a queue number or a send queue identifier (referred to herein as qp_or_sq), a data segment length (DS), and/or other information.

A CQ 324 may be configured to track a completion status of WQEs. When an operation associated with a WQE is completed, a completion event may be generated and placed into a CQ 324. A QP may be associated with one or more CQs 324. Therefore, for each QP, memory may be consumed for the storage of completion events within CQs 324. In some embodiments, one or more QPs may be associated with a single CQ 324. Alternative implementations could replace a CQ with a counter, and/or each WQE may be associated with a different CQ 324/counter.

A DBR 320 may be used as a notification mechanism when new WQEs are put on the WQs 316 or to solicit completion notifications from the CQs 324. Each QP may be associated with a corresponding DBR.

The memory and/or storage devices of the system 200 may store instructions such as software, a program, an application, or other executable code for causing at least any of the CPU 204, the GPU 220, and the peripheral device 224 to perform, alone or in combination, any one or more of the methods described herein. The instructions may in some implementations reside, completely or partially, within at least one of the memory/storage devices illustrated in FIGS. 1-3, or any suitable combination thereof.

In some embodiments, the electronic device(s), network(s), system(s), chip(s), circuit(s), or component(s), or portions or implementations thereof, of FIGS. 1-3, or some other figure herein, may be configured to perform one or more processes, techniques, or methods as described herein, or portions thereof. Such processes may be as depicted by the flowcharts of FIGS. 4, 5, and 6 as described below.

Figures 4, 5:
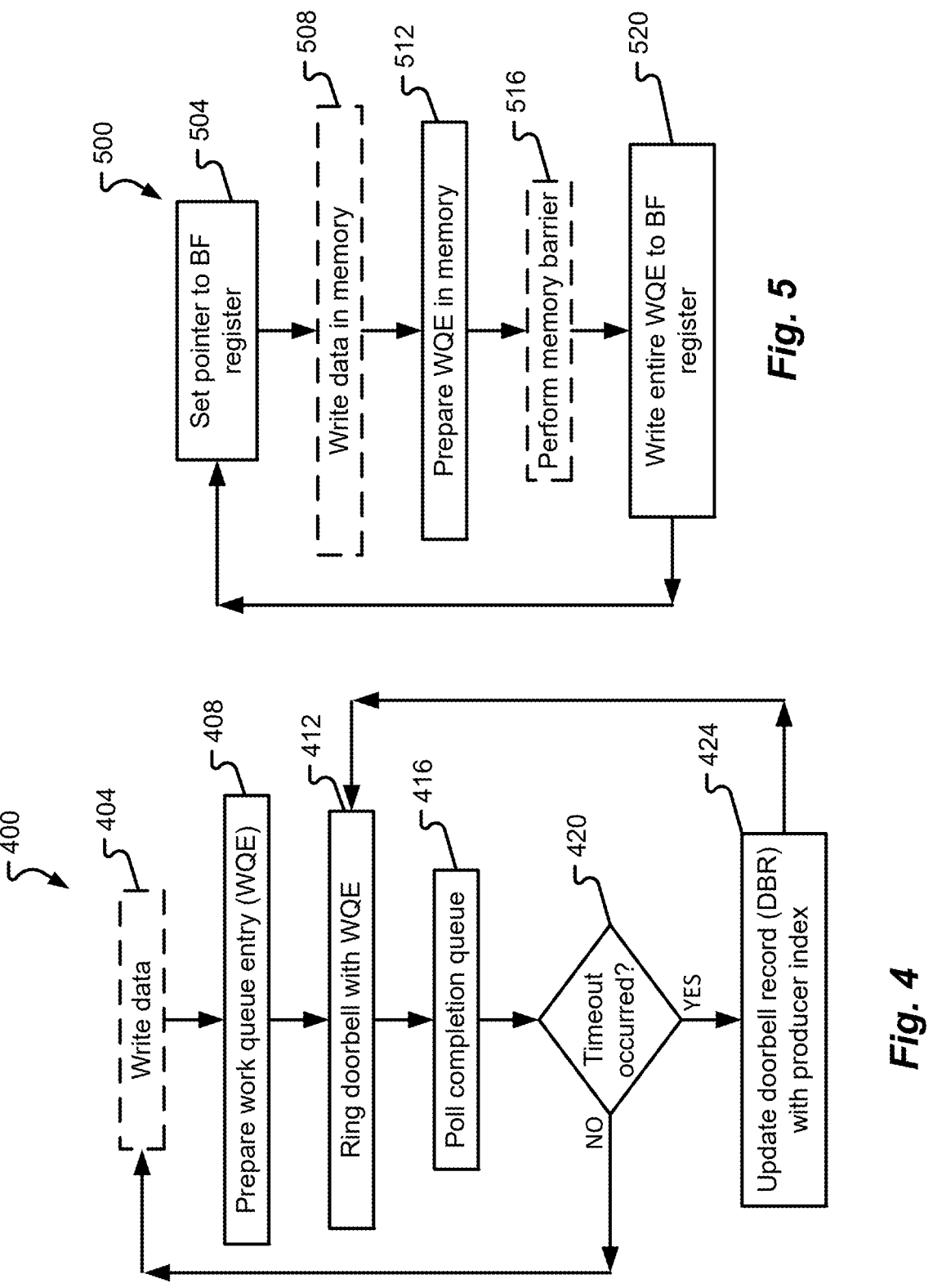
FIG. 4 is a flow diagram illustrating a first method in accordance with one or more of the embodiments described herein.
FIG. 5 is a flow diagram illustrating a second method in accordance with one or more of the embodiments described herein.
Figure 6:
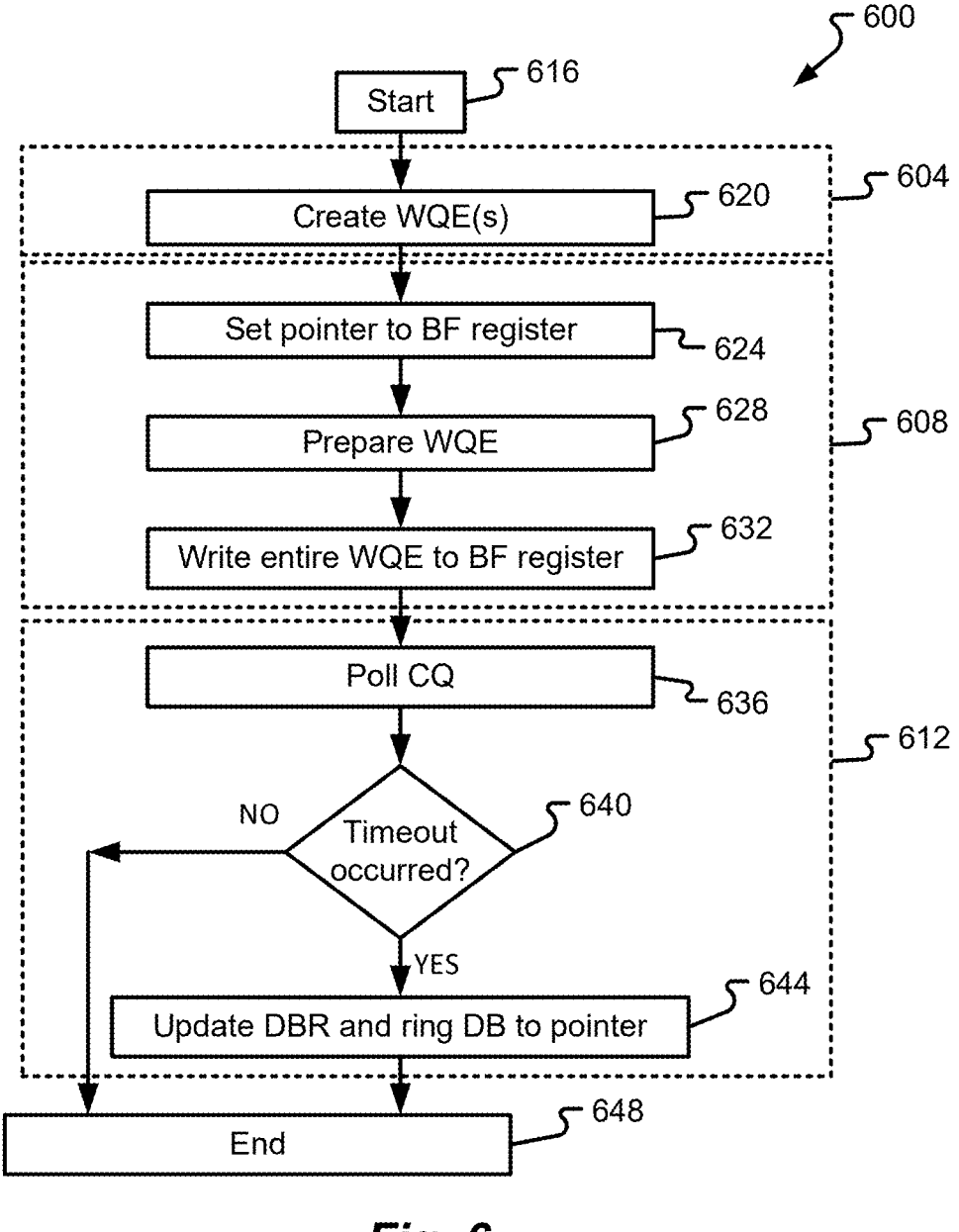
FIG. 6 is a flow diagram illustrating a third method in accordance with one or more oof the embodiments described herein.

In operation, a processing unit 300 may interact with a device 304 (or another processing unit) according to a series of operations as illustrated by the methods 400, 500, and 600 of FIGS. 4, 5, and 6. While examples provided herein refer to the use of GDA-KI, it should be appreciated that the same or similar methods may be utilized for CPU-based post-send, enabling asynchronous post-send for CPUs.

The conventional post-send algorithm involves preparing and sending WQEs to a NIC for execution. The conventional post-send algorithm, to correctly operate, must ensure that data and control information are correctly formatted, ordered, and visible to the NIC, which then performs the specified operations such as data transfers or computational tasks.

The conventional post-send algorithm is designed for sequential processors such as CPUs. The conventional post-send algorithm ensures that a NIC can accurately interpret and execute the tasks described by the WQEs.

In the conventional post-send algorithm, the processor prepares a WQE by writing required task information into a designated area in memory. After preparing the WQE, the processor updates a DBR in memory. This update informs the NIC that a new WQE is ready for processing. The DBR mechanism is used to signal to the NIC about the presence of a new WQE. The DBR typically includes a pointer to the WQE or an index indicating the WQE's location in a queue. After updating the DBR, the processor rings the DB by performing a write operation to a register, indicating to the NIC that the WQE (or WQEs) should be fetched and executed.

During the conventional post-send algorithm, it is critical that the WQE, DBR, and DB writes are performed in a strict order. This is necessary to maintain data consistency and ensure that the NIC interprets and processes the WQE correctly. To enforce this order, the conventional post-send algorithm requires memory barriers to be performed between each of the preparation of the WQE, the updating of the DBR, and the ringing of the DB.

As described above, each memory barrier is a time-consuming task. Because of the conventional post-send algorithm's requirement for multiple memory barriers, the conventional post-send algorithm is a time-consuming process. As described herein, a post-send algorithm may be performed in such a way as to reduce the number of memory barriers required and/or to use less time-consuming memory barriers.

In some implementations of the systems and methods described herein, a WQE may be prepared and used to ring a DB without updating a DBR. As a result, at least one of the memory barriers required by the conventional post-send algorithm, as well as the updating of the DBR, can be removed from the steps required to ring the DB. Using such a system or method reduces the amount of time and latency associated with performing a post-send algorithm.

The method 400 begins at 404 in which data associated with the WQE is written. In some cases, the data associated with the WQE may be contained (or inline) in the WQE itself. In such a case, the step of writing the data at 404 may be omitted. The data written at 404 may be written to dedicated memory of the processing device performing the method 400. In the case of a GPU, such data may be referred to as vidmem which may be dedicated memory within the GPU. The data written at 404 may be data created by an application executed by the processing device performing the method 400. Such data may be created with the intent to be transmitted to a peripheral device or another processing device using a post-send algorithm.

At 408, a WQE associated with the written data may be prepared. The processing device performing the method 400 may prepare the WQE by writing a WQE data structure into a designated memory location such as vidmem. The WQE may include any necessary information for the task to be performed by the peripheral (or other processing) device. In some implementations, a memory barrier may be performed after preparing the WQE to ensure that the WQE preparation is complete and visible before proceeding to the next step. Such a memory barrier may be a membar.gl as described above.

After preparing the WQE at 408 and, in some implementations performing a memory barrier, a DB may be rung using the WQE at 412. Ringing the DB may be performed by performing a write operation to a DB register or other memory location. Ringing the DB may effectively notify the peripheral device or other processing device that the WQE has been prepared and is ready to be read from memory. Writing to the DB register or other memory location may serve as a trigger to a NIC or another device to read the WQE and begin processing the data associated with the WQE. In this way, the processing device performing the method 400 transmits the WQE to the destination prior to updating a DBR with a producer index. In some implementations, a store release function (such as st.release.sys) may be used to ring the DB. In some implementations, ringing a DB may involve transmitting a WQE to a destination device (e.g., a peripheral device or a processing device) or providing a doorbell indication to the destination device indicating that the WQE is available. In some implementations, the WQE may be written to memory of the processing device performing the method 400 or the destination device prior to transmitting the WQE or providing the doorbell indication. Ringing the DB may enable the destination device to read the WQE from the memory of either the processing device performing the method 400 or the destination device.

As described herein, transmitting a WQE to a destination device may involve writing the WQE directly to memory of the destination device or ringing a DB by writing the DB to the destination memory as described above. In some implementations, the WQE or a copy thereof may be maintained in memory of the processing device, while in other implementations no copy of the WQE may be maintained.

The above steps 404, 408, and 412, prior to polling the CQ at 416 as described below, may be performed in a loop for multiple iterations, with each iteration preparing and sending a different WQE. The number of iterations may be system or application dependent and may be any of one or more iterations. Such steps, prior to polling the CQ, may be in a critical path. Because such steps can be performed in a loop without updating the DBR, the goal of reducing the latency as compared to conventional post-send algorithms is achieved.

After ringing the DB at 412, the processing device performing the method 400 may poll a CQ at 416 to determine the progress of the NIC (or other peripheral device or processing device) and to confirm whether the WQEs are being processed. To poll the CQ, a thread may check whether a completion queue event (CQE) is available. The polling may occur over a specific amount of time. For example, if no CQE is available within a threshold amount of time, the thread can determine an execution failure, such as a timeout, has occurred.

Upon polling the CQ at 416, the processing device may determine whether an execution failure has occurred. If an execution failure has not occurred, the method 400 may continue with preparing new WQEs, by returning to writing data at 404 as described above. By continuing in the absence of a timeout status, the method 400 avoids updating the DBR and any memory barriers associated with updating the DBR. If, on the other hand, an execution failure has occurred, the method 400 may involve performing steps to facilitate completion of an operation associated with the WQE. Such steps may include, for example, updating the DBR with a producer index of the latest WQE used to ring the DB at 408 and, after updating the DBR at 424, re-ringing the DB with the latest WQE at 412. Such steps may also or alternatively include, for example, writing the WQE to memory, performing a memory barrier, and re-ringing the DB.

In some implementations, updating the DBR may involve writing a DBR to memory and either re-transmitting the WQE to the destination device (i.e., a peripheral device or a processing device) or providing a doorbell indication to the destination device. In some implementations, a memory barrier may be performed before and/or after updating the DBR.

A timeout as described herein may be a scenario in which a WQE has been transmitted to a destination device or a doorbell indication has been provided to the destination device indicating that the WQE is available, but the WQE has not been consumed after a predetermined amount of time. As described above, while certain embodiments of the present disclosure describe determining a timeout has occurred, the same or similar systems and methods may be applied with regard to other types of execution failures. An execution failure as described herein may occur as a result of a WQE either not being received by a destination device, or a WQE being received but not resulting in completion of an operation associated with the WQE as expected. The systems and methods described herein should not be considered as being limited to determining a timeout has occurred as opposed to any other type of execution failure.

While the systems and methods described herein are described in relation to determining whether a timeout has occurred, it should be appreciated that the same or similar systems and methods may involve determining an execution failure has occurred. An execution failure as described herein may involve an event in which a destination device has failed to execute an operation which should have been prompted by the WQE. For example, the destination device either failed to consume a WQE or consumed the WQE but did not succeed in performing an operation associated with the WQE.

As described herein, determining whether a timeout has occurred, or whether a timeout status exists, may comprise determining a timeout condition exists. A timeout condition may represent either an execution failure has occurred, a timeout has occurred, or another scenario which may necessitate performing one or more steps to facilitate completion of an operation associated with the WQE has occurred. As an example, an execution failure or a timeout may involve failing to receive a completion indication within a predetermined amount of time. In such an example, determining a timeout condition exists may involve determining a completion indication has not been received within the predetermined amount of time. In some implementations, a completion indication may be in the form of an entry in a CQ (or other queue), an asynchronous event, an interrupt, or an entry which is not in a queue, such as an entry in a memory location with a counter and/or status indication, for example.

As another example, an execution failure or a timeout may involve receiving a status indicating failure has occurred. In such an example, determining a timeout condition exists may involve receiving the status indicating failure has occurred. Such a status may include an execute failure status.

In some implementations, an execution failure or a timeout may involve receiving a completion indication including an entry in a CQ, such as by polling the CQ. Whether due to a timeout or to an execution failure, when a timeout condition exists, a WQE may need to be resent, a new WQE may need to be generated, or another step or steps to facilitate completion of an operation associated with the WQE may need to be performed. In some implementations, the steps of preparing the WQE at 408 and ringing the DB at 412 may be repeated multiple times before performing one or more steps to facilitate completion of the operation associated with the WQE.

In some implementations, after updating the DBR and prior to re-ringing the DB, a memory barrier (e.g., Membar.gl) may be required. However, as should be appreciated by the description provided herein, the method 400 enables the processing device performing the method 400 to perform less than two memory barriers prior to polling the CQ at 416. By updating the DBR only in the event of a timeout, the time and computing expense required for updating the DBR and any associated memory barrier can be reduced or avoided completely as timeout scenarios can be expected to rarely or never occur in practice.

In some implementations, a copy of each WQE may be maintained for some time in memory of the device performing the method 400. In other implementations, a WQE buffer may be stamped and the WQE may be written to the destination device instead of or in additional to maintaining a copy of each WQE in memory.

The systems and methods described herein may be used in relation to DB post-send algorithms as well as BlueFlame (BF) and other networking protocols. BF is designed for low latency from the network's perspective. However, the conventional post-send algorithm used for BF suffers from the same downsides as the conventional DB post-send algorithm described above. The method 400 may be performed by, for example, a CUDA thread executing on a GPU. The method 400 assumes the WQE being prepared and used to ring the DB is the size of one WQE basic block (WQEBB), or 64 Bytes. However, it should be appreciated the same or similar methods may be performed using WQEs of any size.

When ringing BF, the entire WQE must be written to a BF register. The writing of the WQE must have a write-combined-like behavior, meaning that (if the WQE size is one WQEBB) the GPU (or other processing device) must generate one 64-byte PCIe write transaction to the NIC (or another device).

To ring BF using a GPU SM, a warp must be used. If the WQE size is one WQEBB (64 bytes), eight threads in the warp may be used to each issue one store (of eight bytes in size) each to the BF register at the same time in a write-combined-like behavior to write the entire 64 bytes of the WQE. The GPU may coalesce the stores and generate one 64 B PCIe write transaction. However, generating eight eight-byte PCIe write transactions may result in the transaction downgrading from the BF protocol to DB. The store.mmio instruction cannot be used because .mmio prevents coalescing.

Conventionally, a BF register is split into two addresses when used in GDA-KI. With each iteration, a different of the two addresses is used as the BF register using an even-odd alternating algorithm. Similar to the DB post-send algorithm described above, each BF of an iteration must arrive at the NIC before the BF of the next iteration. However, because of the alternating between the two addresses, there is no guarantee that the same address ordering of the GPU will be maintained. As a result, a membar.sys is conventionally required at the end of each iteration.

BF conventionally uses a traditional BF post-send algorithm which involves, for each iteration, updating a DBR in memory prior to writing the entire WQE to the BF register. A memory barrier must be performed both immediately prior to and following the updating of the DBR. Also, a system memory barrier (membar.sys) is required at the end of each iteration.

A benefit of using BF as opposed to a traditional DB post-send algorithm is that the NIC (or other device) is not required to read the corresponding WQE in memory of the processing device which prepared the WQE. For this reason, the latency is reduced by one PCIe round-trip. However, the cost of one membar.sys is similar to the cost of one PCIe round trip. Additionally, BF may be silently downgraded to DB when the NIC is busy. This downgrade occurs in high message rate scenarios. As a result, the cost of membar.sys is paid but nothing is gained. For these reasons, the cost of BF outweighs the benefit of BF when performed using conventional systems and methods.

As described herein, a system or method of using BF may provide a low latency use case for BF, such as in GDA-KI, without incurring the costs associated with conventional uses of BF. The systems and methods described herein may be particularly useful when sending a single message to another side when the message is desired to reach the other side as quickly as possible. As illustrated in FIG. 5, such a method 500 may be performed by a processing device. While the implementation of FIG. 5 is described in relation to BF post-send algorithms, the same or similar implementations may also be applicable to existing CPU-based systems and other systems without the use of BF.

The flow chart illustrated in FIG. 5 may be used in a variety of different manners. In the description of the features of the method 500 described below, various optional elements are described. The various optional elements may be used in any combination to perform the method 500 in any number of ways.

At the beginning of the method 500, a pointer may be set to a BF register at 504. The BF register may be a segment of memory within the processing device performing the method 500. The segment of memory may be identified by an address (or BF address). In some implementations, a single BF address may be used—avoiding the switching of addresses required by conventional BF post-send algorithms as described above—while in other implementations two or more BF addresses may be switched between for each iteration. In implementations in which two or more BF addresses are used, the BF register may effectively be split into two or more registers, with each register being consecutive segments of memory.

In some implementations, a decision may be made as to whether the same BF address may be used. Such a decision may be made based, at least in part, on a size of the WQE to be prepared. For example, if the WQE is the size of one WQEBB, the same BF address may be used for each iteration. If the same BF address is used for each iteration, the relatively expensive system-wide memory barrier (e.g., membar.sys) required by conventional BF post-send algorithms may be omitted, providing a benefit as compared to such conventional BF post-send algorithms.

Using the same address for each iteration may be useful in cases in which the WQE is at most one WQEBB. In such cases, the GPU (or other processing device) guarantees ordering to the same address, which avoids the relatively expensive membar.sys. While such a scheme may not be universal, it may be sufficient in many use cases such as NVSHMEM PUT and NVSHMEM GET with connections utilizing reliable connection (RC) transport which leverage remote direct memory access (RDMA) to provide communication between two GPUs.

In some cases, setting the pointer to the BF register may be followed by an stg.ordered.weak command or another ordered storage command. Such an ordered storage command may be capable of ensuring operations occur in a predictable order. A weakly ordered command, such as stg.ordered.weak, may enable memory operations to be completed out of a specified sequence, while a strongly ordered command, such as stg.ordered.strong (as described below), may enforce a strict sequency of memory operations.

At 508, data to be transmitted via BF may be written in memory of the processing device performing the method 500. The data may be written in vidmem for example, or another dedicated memory device within or in communication with the processing device performing the method 500. If the data is inline in the WQE, the writing of the data may be omitted. In some implementations, the writing of the data in memory may be followed by an stg. ordered. weak command as described above.

At 512, a WQE may be prepared in memory. Preparing, or creating, the WQE may be performed by creating a ctrl segment with specific instructions for the peripheral device or other processing device with which the processing device performing the method 500 is seeking to communicate. The WQE may be prepared in vidmem, in the case of a GPU performing the method 500.

After preparing the WQE, a synchronization function such as a _syncwarp may be performed to synchronize the threads of the warp performing the method 500. The synchronization function may ensure that the threads of the warp reach the same execution point before proceeding.

At 516, a memory barrier may be performed. The memory barrier may be, for example, a membar.gl command. The memory barrier may not be necessary if an ordered command, such as stg.ordered.weak, was performed prior to preparing the WQE at 512 as described above. In such a case, the writing of the WQE to the BF register at 520 as described below may be performed using an stg. ordered. strong command.

At 520, the WQE may be written to the BF register. For a WQE of the size of one WQEBB, each of eight threads of the warp can write a portion of the WQE to the BF register (as indicated by the pointer). For a WQE of the size of n WQEBBs, each of n times eight threads can write its portion of the WQE to the BF register (as indicated by the pointer).

Once the WQE is written to the BF register, in some implementations one of three scenarios may take place. In the example of a GPU communicating with a NIC, the NIC may accept the entire BF, in which case the NIC can process the WQE written to the BF immediately. In another scenario, the NIC may downgrade the BF to DB, in which case the NIC may be required to read the corresponding WQE in memory of the GPU. By performing a memory barrier at 516, it should be guaranteed that the WQE is visible. In a third scenario, the NIC may drop the BF as opposed to downgrading the BF. To avoid such a scenario, the method 500 may in some implementations, after writing the entire WQE to the BF register, ring a DB to the BF pointer address, before performing a by a membar. sys memory barrier which should effectively notify the NIC again using DB to process the WQE.

After writing the WQE to the BF register, another synchronization mechanism, such as a _syncwarp, may be performed to ensure the threads are synchronized, and have completed writing the WQE to the BF register before proceeding.

At this point, at least in some implementations, one or more of the threads may be freed to perform useful computation. Outside the communication critical path, a CQ may be periodically polled (after every WQE, after every n WQEs, etc.) using a method as described above in relation to FIG. 4.

In some implementations, only one in-flight WQE may be allowed at any given time, and membar.sys can be avoided at the end of each iteration. Instead, the communication part may be exited, and the threads may be freed to do useful computation. In some implementations, prior to preparing the WQE, the processing device may be configured to determine whether a number of in-flight WQEs is less than a threshold. The threshold may be one WQE or any other number of WQEs.

Before going to a next iteration, the CQ may be polled. Unless the computation is extremely short, the CQE should have arrived to the CQ. Thus, poll CQ can be expected to return immediately. Next, it can be confirmed that there is no in-flight BF write from GPU to the NIC because the WQE has already been processed and the next iteration can be safely entered as there is no way that the BF write of iteration i will arrive after the BF write of iteration i+1.

FIG. 6 illustrates a method 600 in which a DB is rung to a BF pointer without requiring a memory barrier to be performed within the communication path. Such a method 600 enables BF to be used to perform a post-send algorithm without incurring the downsides of the conventional BF post-send algorithm described above.

The method 600 involves three phases, a setup phase 604, a communication phase 608, and a poll CQ phase 612.

The method 600 may start at 616 with a processing device such as a CPU or GPU executing an application which seeks to communicate to a peripheral device or other processing device. In some implementations, each of the three phases may be performed by separate processing devices while in other implementations a single processing device may perform two or three of the phases.

The setup phase 604 may be performed by a CPU or other processing device. At 620, the processing device may create a queue pair (QP) with a depth of D, where D is a power of two, and create one or more WQEs. The WQE(s) created may contain NOP opcodes with a wqe_idx from 0 to D−1. The WQEs may fill all available WQ slots.

The communication phase 608 may be performed by a CUDA warp. If the initiator side has data associated with the WQE(s), the data should be inline to the WQE(s). In this way, because data is not written to memory, a memory barrier (such as membar.gl) can be avoided. The features of the communication phase 608 may execute in a for loop, for each of the WQEs created at 620. The communication phase 608 may include, for a first WQE, setting a pointer to a BF register at 624. Setting the pointer to the BF register may be as described above and the BF register may iterate between two or more different BF register addresses in some implementations.

At 628, the first WQE may be prepared by setting the wqe_idx associated with the WQE in a register or local memory. The WQE may not be written to a WQ buffer. After preparing the WQE, a synchronization mechanism may be performed using, for example, _syncwarp.

At 632, the entire WQE may be written to the BF register, by using multiple threads, where each thread writes a separate eight bytes of the WQE to the BF register. This feature may be similar to the writing of the WQE to the BF register 520 of the method 500 of FIG. 5 as described above.

After the communication phase 608 is completed, one or more threads which performed the communication phase 608 may be freed to perform other operations while the same or another CUDA warp performs the poll CQ phase 612.

Within the poll CQ phase 612, a CQ may be polled at 636. Polling the CQ may be the same as or similar to the polling of the CQ at 416 of the method 400 described above in relation to FIG. 4. Via the polling of the CQ at 636, a determination may be made as to whether a timeout has occurred at 640. Determining whether the timeout has occurred at 640 may be the same as or similar to the feature of determining whether the timeout occurred at 420 in the method 400 described above in relation to FIG. 4.

If a timeout has occurred, the poll CQ phase 612 may include, at 644, updating a DBR and ringing a DB to the pointer set to the BF register at 624. If, on the other hand, a timeout has not occurred (or after updating the DBR and ringing the DB), the method 600 may end at 648.

The systems and methods described herein may provide a post-send algorithm which is particularly useful in low message rate use cases in which low latency is an important factor. Such systems and methods may be implemented as a feature alongside other algorithms which provide for high-message-rate post-send. In some implementations, QPs may be separated into two groups: 1) high message rate, and 2) low latency. If a user or application seeks a high message rate, a high-message-rate post-send algorithm may be utilized. If a user or application seeks a low latency, which may come at the cost of message rate, a low latency post-send algorithm such as described herein may be utilized.

In some implementations, a low-level communication API may be configured to accept a flag to distinguish these two use cases. QPs can be provided with a flag which may be used to determine whether the QP should be treated with a high message rate algorithm or a low latency algorithm.

Such a low-level API may be exposed to applications or in some implementations a heuristic algorithm may be created at an upper layer to decide when to use high message rate and when to use low latency. Such a heuristic algorithm may consider factors such as a busyness level of the NIC (or other peripheral device), a number of in-flight WQEs at any given time (such as may be tracked by a library such as NVSHMEM), and/or other factors to make an informed decision as to whether to use the low latency algorithm or a high message rate algorithm. For example, the low-latency group may, in some implementations, be used only if the number of in-flight WQEs is less than a threshold.

Aspects of the above systems and networking device include any one or more of the features as substantially disclosed herein in combination with any one or more other features as substantially disclosed herein.

Aspects of the above systems and networking device include any one of the aspects/features/embodiments in combination with any one or more other aspects/features/embodiments.

Aspects of the above systems and networking device include any use of any one or more of the aspects or features as disclosed herein.

It is to be appreciated that any feature described herein can be claimed in combination with any other feature(s) as described herein, regardless of whether the features come from the same described embodiment.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising one or more circuits to:
prepare a work queue entry (WQE);
transmit the WQE to a destination device by using a plurality of threads to write the WQE to memory of the destination device; and
in response to determining an execution failure has occurred, perform at least one step to facilitate completion of an operation associated with the WQE.

2. The system according to claim 1, wherein the WQE is written to memory prior to transmitting the WQE.

3. The system according to claim 1, wherein the execution failure comprises failing to receive a completion indication within a predetermined amount of time.

4. The system according to claim 1, wherein the execution failure comprises receiving a status indicating failure.

5. The system according to claim 1, wherein the one or more circuits are further to repeat transmitting the WQE to the destination device after determining the execution failure has occurred.

6. The system according to claim 1, wherein the at least one step to facilitate completion of the operation associated with the WQE comprises writing a doorbell record to memory and repeating the transmitting of the WQE to the destination device.

7. The system of claim 1, wherein the one or more circuits are further to write the WQE to memory.

8. The system of claim 1, wherein the at least one step to facilitate completion of the operation associated with the WQE comprises updating a doorbell record (DBR) and performing a memory barrier.

9. The system of claim 8, wherein the at least one step to facilitate completion of the operation associated with the WQE further comprises retransmitting the WQE to the destination device or providing a doorbell indication to the destination device indicating that the WQE is available.

10. The system of claim 1, wherein the one or more circuits are further to stamp a WQE buffer.

11. The system of claim 10, wherein the WQE is transmitted to the destination device in an absence of writing the WQE to memory.

12. The system of claim 10, wherein the WQE is transmitted to the destination device after writing the WQE to memory, wherein no memory barrier was performed prior to transmitting the WQE to the destination device.

13. The system of claim 1, wherein the at least one step to facilitate completion of the operation associated with the WQE comprises:

writing the WQE to memory;
performing a memory barrier; and
ringing a doorbell (DB).

14. The system of claim 13, wherein the at least one step further comprises updating a doorbell record (DBR) and performing a second memory barrier.

15. The system of claim 14, wherein updating the DBR comprises updating the DBR with a producer index.

16. The system of claim 1, wherein the one or more circuits are to repeat at least one of preparing the WQE and transmitting the WQE to the destination device multiple times before performing the at least one step to facilitate completion of the operation associated with the WQE.

17. The system of claim 1, wherein the execution failure comprises receiving one or more of a completion indication comprising an entry in a completion queue (CQ), a status in a memory location, an asynchronous event, and an interrupt.

18. The system of claim 17, wherein receiving the completion indication comprises polling the CQ.

19. The system of claim 18, wherein the one or more circuits perform fewer than two memory barriers prior to polling the CQ.

20. The system of claim 1, wherein sequential WQEs are written to a single address of the memory of the destination device.

21. The system of claim 1, wherein sequential WQEs are written to different addresses of the memory of the destination device.

22. The system of claim 1, wherein the one or more circuits are further to synchronize the plurality of threads after preparing the WQE and before transmitting the WQE.

23. The system of claim 1, wherein prior to preparing the WQE, the one or more circuits determine a number of in-flight WQEs is less than a threshold.

24. A communication apparatus comprising one or more circuits to:

prepare a work queue entry (WQE);
transmit the WQE to a destination device by using a plurality of threads to write the WQE to memory of the destination device; and
in response to determining an execution failure has occurred, perform at least one step to facilitate completion of an operation associated with the WQE.

\* \* \* \* \*